United States Patent Office

3,045,009
Patented July 17, 1962

3,045,009
METHOD FOR CONVERTING N-CHLORO-ε-CAPROLACTAM TO α-CHLORO-ε-CAPROLACTAM
Arthur O. Rogers, Lewiston, N.Y., assignor to E. I. du Pont de Nemours and Company, Wilmington, Del., a corporation of Delaware
No Drawing. Filed May 26, 1958, Ser. No. 737,481
5 Claims. (Cl. 260—239.3)

This invention relates to a method for converting N-chloro-ε-caprolactam to α-chloro-ε-caprolactam. The latter is a valuable intermediate for the production of lysine which is one of the essential amino acids.

A classical method of synthesizing lysine (Eck and Marvel, Org. Syn. Coll., vol. II pp. 74–78 and 374–376 (1943), involves: (1) hydrolyzing ε-caprolactam to ε-aminocaproic acid, (2) converting the latter with benzoyl chloride to ε-benzoylaminocaproic acid which is (3) brominated with bromine and phosphorus to yield ε-benzoylamino-α-bromocaproic acid, (4) reacting the latter with ammonia, and (5) hydrolyzing the resulting ε-N-benzoyllysine to lysine. The above method has been modified (Galat, J.A.C.S. 69, 86 (1947)), by chlorinating with sulfuryl chloride instead of brominating in step (3).

The α-chloro-ε-caprolactam obtained from N-chloro-ε-caprolactam according to the method of the invention, can be readily converted to lysine as indicated below. Since the starting N-chloro-ε-caprolactam can be readily obtained from ε-caprolactam by known methods, the method of the invention can be viewed as a step in the production of lysine by a route which also starts with ε-caprolactam, which route involves different reactions, different and less expensive chemical reactants and fewer steps than does the above route.

An object of the invention is to provide a method of producing α-chloro-ε-caprolactam. A further object is to provide a method for converting N-chloro-ε-caprolactam to α-chloro-ε-caprolactam which may be used as an intermediate in the production of lysine. Other objects will be apparent from the following description.

N-chloro-ε-caprolactam has the following formula

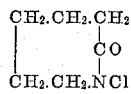

in which the chlorine is present as active chlorine, i.e. it will oxidize iodide ion to free iodine. Because of its active chlorine content, the compound is useful as a bleaching and disinfecting agent and for other purposes for which active chlorine-containing compounds are used. It is also useful as an intermediate in the production of lysine by the method described below.

The above N-chlorocaprolactam can be readily prepared by chlorinating ε-caprolactam in an inert reaction medium such as carbon tetrachloride, tetrachlorodifluoroethane, trichlorotrifluoroethane, benzene, heptane or water. When using chlorine as the chlorinating agent, it is preferred, although not essential, that a basic material be added to the reaction mixture to combine with the hydrogen chloride liberated during the chlorination. Any basic material which reacts with hydrogen chloride but is substantially inert towards caprolactam and the N-chlorocaprolactam product can be used. Examples are the alkali metal and the alkaline earth metal hydroxides, carbonates and bicarbonates. Generally, from 1 to 2 neutralizing equivalents of the acceptor will be added per mole of chlorine to be reacted, but larger amounts can be used. If no acid-acceptor is added, part of the caprolactam itself serves as acid-acceptor, forming a well-defined caprolactam hydrochloride. When using hypochlorous acid (in absence of other acid) or a hypochlorite, e.g. an alkali metal or an alkaline earth metal hypochlorite such as sodium or calcium hypochlorite, respectively, or an organic hypochlorite, e.g. methyl or t-butyl hypochlorite, as the chlorinating agent, no acid-acceptor is required. These alternative chlorinating procedures are illustrated by the following equations:

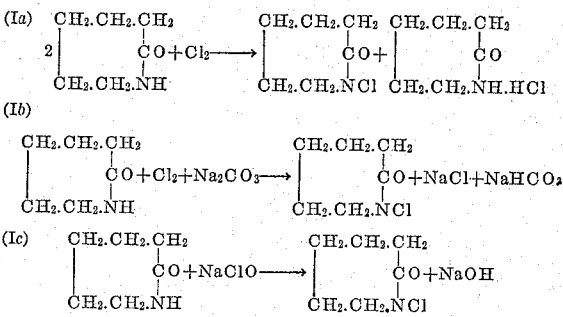

In the reaction of Equation Ia, one mole of the starting caprolactam acts as acid-acceptor while in the reaction of Equation Ib, the acid-acceptor is sodium carbonate. The reaction of Equation Ic requires no acid-acceptor.

The above chlorination reactions occur rapidly at room temperature and temperatures from room temperature to about 80° C. will generally be used. Higher temperatures up to 110° C. can be used as can also temperatures below room temperature, e.g. 0° C. and lower, so long as the reaction medium remains liquid. Approximately stoichiometric amounts of the chlorinating agent are preferably employed, e.g. 0.9 to 1.1 moles of chlorine or sodium hypochlorite per mole of caprolactam to be chlorinated, keeping in mind that only half of the caprolactam is chlorinated while the remaining half serves as acid-acceptor when chlorine is used in the absence of added acid-acceptor. Lesser or greater proportions of the chlorinating agents, e.g. equivalent to deficiencies and excesses a great as 20% and more, can be used but result in no advantages.

N-chloro-ε-caprolactam has been isolated as a viscous liquid which is stable to mild heat (up to about 110° C.) but decomposes with a slight puff when strongly heated, e.g. over an open flame. It is a strong oxidizing agent. Its oxidizing power is retained during even prolonged heating at temperatures up to 100° C., but is lost quite rapidly when the compound is subjected to temperatures above about 115° C. Thus, at 120° C. the compound undergoes an auto-chlorination or rearrangement reaction in which the chlorine atom transfers from nitrogen to carbon and is no longer "active chlorine." The oxidizing power of N-chloro-ε-caprolactam is also rapidly destroyed by the action of certain catalysts, e.g. phosphorus trichloride and sulfur monochloride, even at room temperature.

Lysine can be produced from N-chloro-ε-caprolactam according to the following reaction steps:

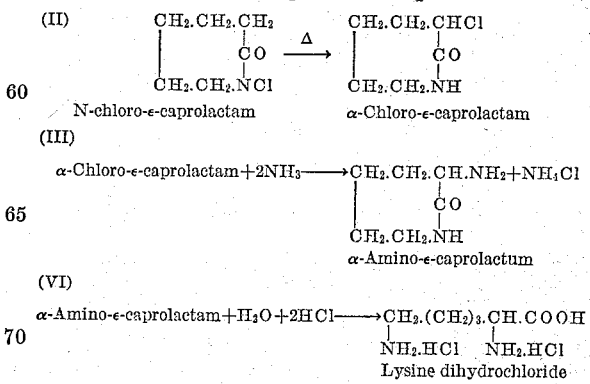

The reaction of step II above is effected in accordance with the invention by heating N-chloro-ε-caprolactam to a temperature above 115° C. to effect its auto-chlorination or rearrangement to α-chloro-ε-caprolactam. The reaction is preferably carried out at temperatures ranging from 120 to 130° C. although higher temperatures, e.g. up to 150° C., can be used so long as they are not high enough to cause excessive decomposition of the desired product. The reaction can be effected in the absence of a solvent or diluent. However, it is preferred that a liquid diluent inert to the N-chlorocaprolactam and the α-chlorocaprolactam product be present in an amount sufficient to moderate the reaction effectively, a weight ratio of diluent to N-chlorocaprolactam of about 1:1 to 10:1 or higher being generally satisfactory. Suitable diluents are carbon tetrachloride, tetrachlorodifluoroethane and trichlorotrifluoroethane. When using diluents which boil below the desired reaction temperature, the reaction should of course be carried out in a closed vessel capable of withstanding the pressure which will be developed. Heating at the desired temperature should be continued until the oxidizing power of the N-chlorocaprolactam is substantially destroyed, i.e. until the reaction mixture no longer will liberate iodine from potassium iodide. A time of 1 to 2 hours at the preferred temperatures is generally adequate.

The reaction of step III is carried out be reacting the product of step II with ammonia, which may be aqueous or anhydrous. The amount of ammonia generally will range from the theoretical amount required up to about 30 times the theoretical amount, amounts corresponding to a 2 to 10 fold excess of ammonia being preferred. The reaction will proceed at room temperature but temperatures of 40 to 100° C. are preferred. Higher temperatures, e.g. up to about 150° C. can be used. Several days may be required to complete the reaction at room temperature, whereas the reaction time may be as short as 15 minutes to 2 hours when using elevated temperatures, depending upon the temperature used. No solvent or diluent other than the excess ammonia is required, although the use of an alcohol or water solvent is advantageous. If a solvent, e.g. carbon tetrachloride, capable of reacting with ammonia has been used in step II, it should be removed prior to carrying out the reaction of step III.

The reaction of step IV is readily carried out by heating the product of step III with an aqueous solution of a strong acid or a strong base. An aqueous solution of hydrochloric, hydrobromic or sulfuric acid, or of an alkali metal hydroxide or carbonate, will generally be used, for example at temperatures of 50° C. to the boiling temperature. Temperatures above the atmospheric boiling point, e.g. up to 150° C. can be used by effecting the hydrolysis in a closed vessel. The hydrolysis can be effected under any of the conditions known to be effective in hydrolyzing ε-caprolactam to ε-aminocaproic acid.

While the reactions of steps II, III and IV are believed to proceed by the reaction mechanisms shown above, the intermediate reaction products have not been absolutely identified. It has, however, been definitely established that lysine is produced as a final product when the above steps are carried out in the sequence shown.

The invention is illustrated by the following examples, Examples 1 and 2 of which show methods for obtaining the starting N-chloro-ε-caprolactam.

EXAMPLE 1

*Chlorination of ε-Caprolactam in Absence of Added Acid-Acceptor*

ε-Caprolactam (0.5 mole, 57 g.) was dissolved in carbon tetrachloride (250 ml.) and chlorine gas was passed into the solution at room temperature with stirring. The chlorine was absorbed rapidly and a colorless, crystalline precipitate of ε-caprolactam hydrochloride formed. The addition of chlorine was stopped when the solution turned yellow, indicating the presence of free chlorine. At this point, the gain in weight of the mixture showed that 0.25 mole of chlorine had been absorbed and reacted. The precipitated ε-caprolactam hydrochloride was filtered off. When washed with carbon tetrachloride and dried, it was found to be identical with ε-caprolactam hydrochloride made by treating ε-caprolactam with anhydrous hydrogen chloride.

The filtrate, following separation of the above hydrochloride, was analyzed for active chlorine by the conventional method. This involves reaction of a sample of the material with a solution of iodide and titration of the iodine thus liberated with a standard solution of thiosulfate. This analysis showed the reaction mixture to contain 0.202 mole of active chlorine (81% of the theoretical amount). A portion of the filtrate was boiled under reflux for 24 hours with periodic analysis for active chlorine. After an initial minor loss due to expulsion of free chlorine, the titer remained constant. The resulting solution was then evaporated to constant weight on a steam bath under vacuum to yield a viscous oil. Titration of this oil showed that it contained essentially all of the active chlorine present in the solution from which it was obtained.

EXAMPLE 2

*Chlorination of ε-Caprolactam in the Presence of Sodium Carbonate*

This example illustrates the chlorination of ε-caprolactam in the presence of sodium carbonate as acid-acceptor.

Chlorine gas was introduced at room temperature with stirring into a mixture of ε-caprolactam (0.1 mole, 11.3 g.), sodium carbonate (0.15 mole, 15.9 g.) and carbon tetrachloride (100 ml.) until the mixture developed a yellow color indicating the presence of free chlorine. The mixture of solids formed (mostly sodium chloride and sodium bicarbonate) was filtered off, and after washing with carbon tetrachloride and drying, was found to contain somewhat more than the calculated amount of chlorine as chloride. The combined filtrate and washings contained active chlorine equal to 101% of the theoretical amount, based on conversion of all of the ε-caprolactam to N-chloro-ε-caprolactam. Boiling to expel free chlorine reduced the active chlorine content to 93.5% of the theoretical value.

EXAMPLE 3

*Production of Lysine From ε-Caprolactam*

A solution of ε-caprolactam (0.4 mole, 45.2 g.) in carbon tetrachloride (200 ml.) was treated with chlorine under stirring in a vessel provided with a reflux condenser until a permanent yellow color developed. During this treatment, the temperature reached a maximum of 40° C. and ε-caprolactam hydrochloride precipitated. The gain in weight of the mixture was 14 g. compared with a theoretical value of 14.2 g. (0.2 mole chlorine) for conversion of half (0.2 mole) of the caprolactam to N-chloro compound. After filtering off the caprolactam hydrochloride crystals and washing them with carbon tetrachloride, one-half of the combined filtrate and washings was heated 2 hours at 120° C. in sealed glass tubes. The resulting mixture was free of active chlorine but contained a small amount of tar and a crystalline precipitate. After filtering out the latter, the solution was evaporated under vacuum in a bath at 40° C. The residue was an amber-colored, viscous liquid.

The above residue was mixed with 20.5 ml. (0.31 mole) of concentrated aqueous ammonia and 2.2 g. of ammonium carbonate ($NH_4HCO_3 \cdot NH_2CO_2NH_4$) and the mixture allowed to stand 18 days at room temperature. The resulting solution was then evaporated to dryness on the steam bath under vacuum. The semi-solid residue was dissolved in a mixture of 80 ml. (1 mole) concentrated hydrochloric acid and 80 ml. water, and the mixture was heated 4 hours in a steam bath. The resulting mixture was then evaporated to dryness on the steam bath under vacuum. The product in the residue was separated from by-product ammonium chloride by extracting the residue with boiling methanol and diluting the extract with acetone. The resulting solution was shown by paper chromatography to contain lysine.

The product lysine can be recovered from the reaction mixture of step IV by conventional methods. One such method involves passing an aqueous solution of the reaction mixture over a cation-exchange resin, e.g. a sulfonated copolymer of styrene and divinylbenzene, in its ammonium form, and then eluting adsorbed lysine from the resin with aqueous ammonia.

The method of the invention for thermally converting N-chloro-$\epsilon$-caprolactam to $\alpha$-chloro-$\epsilon$-caprolactam constitutes an important step in the over-all method described for producing lysine from $\epsilon$-caprolactam. The latter method is advantageous over prior methods using the same starting material in that it is simpler, more direct and avoids use of various relatively expensive processing chemicals required in prior methods. Thus, it involves fewer reaction steps, avoids the use of benzoyl chloride and permits the use of cheap chlorine or hypochlorite in place of bromine and phosphorus, or sulfuryl chloride.

I claim:
1. The method comprising heating N-chloro-$\epsilon$-caprolactam at a temperature above 115° C. but not higher than 150° C. whereby said N-chloro-$\epsilon$-caprolactam is thermally rearranged to $\alpha$-chloro-$\epsilon$-caprolactam.
2. The method of claim 1 wherein the N-chloro-$\epsilon$-caprolactam is heated to a temperature of 120 to 130° C.
3. The method of claim 2 wherein the N-chloro-$\epsilon$-caprolactam is heated in the presence of a liquid diluent which is inert to said N-chloro-$\epsilon$-caprolactam and to the $\alpha$-chloro-$\epsilon$-caprolactam product.
4. The method of claim 2 wherein the heating at the temperature specified is carried out for a time of from 1 to 2 hours.
5. The method of claim 3 wherein the heating at the temperature specified is carried out for a time of from 1 to 2 hours.

References Cited in the file of this patent
UNITED STATES PATENTS

| | | |
|---|---|---|
| 2,311,507 | Arthur | Feb. 16, 1943 |
| 2,425,283 | Long et al. | Aug. 5, 1947 |
| 2,564,649 | Rogers | Aug. 14, 1951 |
| 2,832,768 | Frances et al. | Apr. 29, 1958 |
| 2,832,770 | Hopkins et al. | Apr. 29, 1958 |
| 2,876,218 | Francis | Mar. 3, 1959 |